United States Patent [19]

Harris

[11] Patent Number: 5,049,869

[45] Date of Patent: Sep. 17, 1991

[54] DIMMING CIRCUIT FOR DUAL DISPLAY AIRCRAFT INSTRUMENTS

[75] Inventor: Gregory W. Harris, Everett, Wash.

[73] Assignee: Korry Electronics Company, Seattle, Wash.

[21] Appl. No.: 368,257

[22] Filed: Jun. 19, 1989

[51] Int. Cl.$^5$ ............................................. G09G 5/00
[52] U.S. Cl. ............................... 340/815.01; 307/350;
307/358; 307/362; 340/815.02; 340/815.03;
340/815.04; 315/77; 315/296
[58] Field of Search ....................... 307/350, 358, 362;
340/815.01, 815.02, 815.03, 815.04, 767, 945,
971, 660, 661, 662, 23, 295, 753, 754; 350/145;
362/227, 293; 358/161; 315/77, 296

[56] References Cited

U.S. PATENT DOCUMENTS

| | | | |
|---|---|---|---|
| 4,311,994 | 1/1982 | Kuribayashi | 340/661 |
| 4,574,276 | 3/1986 | Sato | 340/662 |
| 4,613,770 | 9/1986 | Raab | 307/350 |
| 4,722,028 | 1/1988 | Brannon et al. | 362/293 |
| 4,724,375 | 2/1988 | Dittmar | 340/662 |
| 4,904,991 | 2/1990 | Jones | 340/971 |

*Primary Examiner*—Ulysses Weldon
*Assistant Examiner*—D. Miller
*Attorney, Agent, or Firm*—Christensen, O'Connor, Johnson & Kindness

[57] ABSTRACT

A dimming circuit (10) for use with an illuminated dual display (12) of an aircraft instrument is provided. A voltage divider (14) divides a variable supply voltage, $V_S$, produces an input voltage, $V_{IN}$, and applies $V_{IN}$ to one input of a switch (16). A threshold voltage circuit (15) receives the $V_S$ voltage and produces a reference voltage, $V_{REF}$, and a lower magnitude supply voltage, $V'_S$. A reference comparator (OA3) compares the $V_{REF}$ and $V'_S$ voltages and produces a threshold voltage, $V_T$. The $V_T$ voltage is applied to a second input of the switch (16). A first comparator (OA1) in the switch (16) produces a low output voltage when the $V_T$ voltage exceeds the $V_{IN}$ voltage and causes a first lamp (L1) to brightly illuminate a first indicia (24). A second comparator (OA2) in the switch (16) produces a low output voltage when the $V_T$ voltage is less than the $V_{IN}$ voltage, which causes a second lamp (L2) to dimly illuminate a second indicia (26). The illuminated first indicia (24) provides daytime illumination of the dual display (12) and the illuminated second indicia (26) provides nighttime illumination. A night vision goggle compatible filter (22) makes the indicia (26) readable by crew members wearing night vision goggles. The voltage divider (14) and threshold voltage circuit (15) operate to ensure a substantial difference between the values of the $V_{IN}$ and $V_T$ voltages, and thus, provide precise switching between daytime and nighttime illumination of the instrument (12).

25 Claims, 1 Drawing Sheet

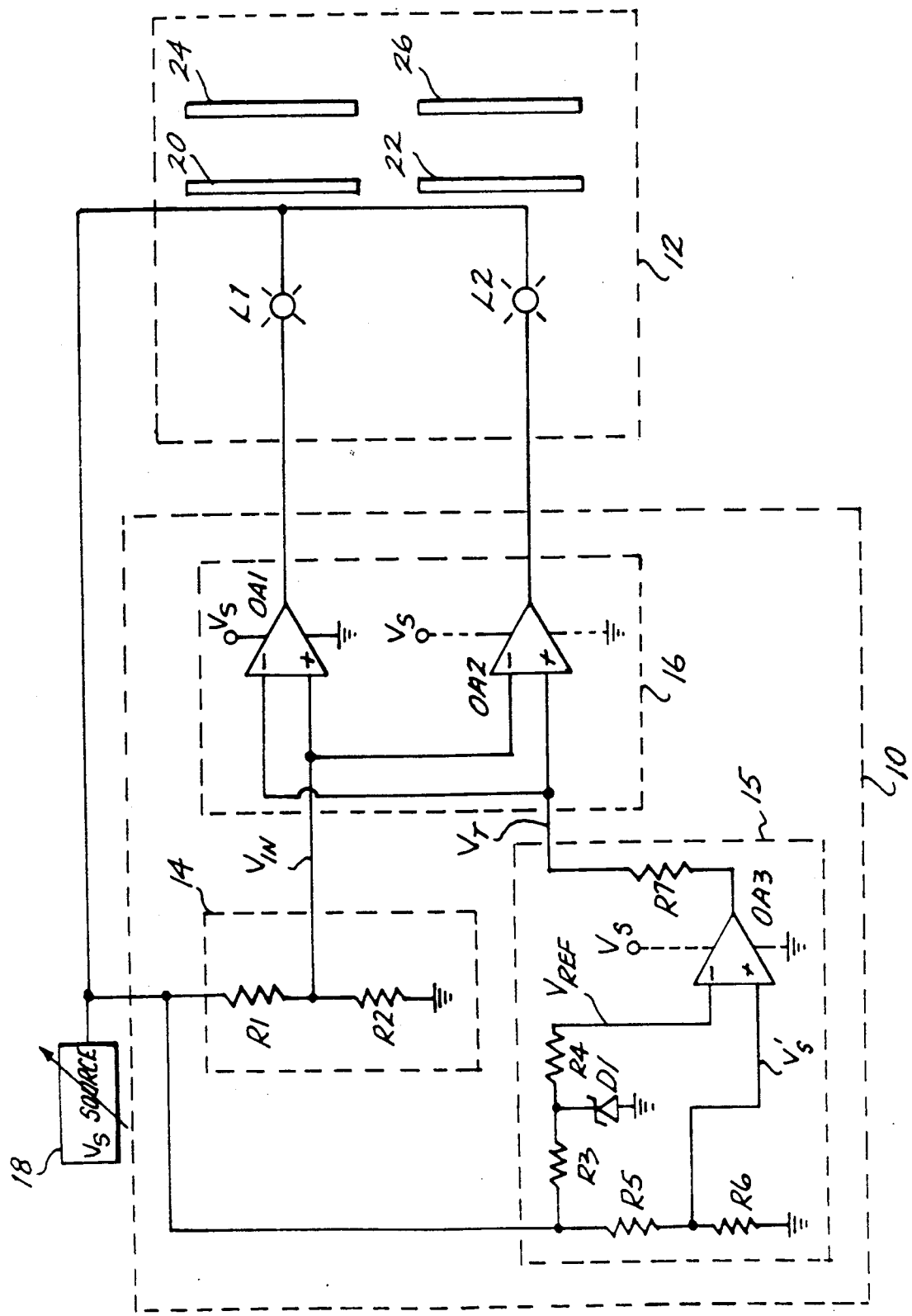

DIMMING CIRCUIT FOR DUAL DISPLAY AIRCRAFT INSTRUMENTS

FIELD OF THE INVENTION

This invention relates to lighting control circuits and, more particularly, to dimming circuits for use with lighting instrument displays in aircraft.

BACKGROUND OF THE INVENTION

The illumination of aircraft instruments, i.e., indicator and switch displays, presents unique problems not found in other lighting applications. The safe operation of an aircraft requires that instrument displays be illuminated so that crew members may read the displays during both daytime and nighttime operation of the aircraft. During daytime operation, the displays must be brightly illuminated to overcome the effects of direct or diffuse sunlight impinging on a display and washing out the display. During nighttime operation, however, the displays do not need to be as brightly illuminated. In fact, for certain types of aircraft, such as military aircraft in which crew members wear night vision goggles (NVG), it is imperative that the illumination of the displays be reduced during nighttime operation of the aircraft. Night vision goggles amplify light in a limited wavelength band. Because light is amplified, the night vision capability of crew members wearing night vision goggles is improved. The amplification provided by night vision goggles requires that the lighting level of instrument displays be reduced from the bright daytime lighting level to a lower nighttime lighting level so that the night vision goggles are not overpowered by the brightness of the display. If the illuminated displays are not dimmed from the daylight lighting level, the night vision goggles may become temporarily nonfunctional, effectively blinding the crew member(s) wearing the goggles and placing both the crew and the aircraft in peril.

One approach used by the prior art to provide both daytime and nighttime illumination of an aircraft instrument displays, is to apply a variable voltage to the lamps that light the display. Conventional instruments typically include one set of lamps that light a single display. The application of a low voltage causes the set of lamps to light the display to a dim, i.e., nighttime, illumination level. The application of a high voltage causes the lamps to light the display to a bright, i.e., daytime, illumination level.

In this prior art approach, if the display is to be readable by crew members wearing night vision goggles, a night vision goggle compatible filter is inserted between the lamps and the display. The night vision goggle compatible filter further reduces the amount of light emanating from the instrument display in the wavelength band that the night vision goggles are sensitive to (e.g., in the 600-900 nm range). One problem associated with this approach is that the night vision goggle compatible filter remains in use during the daytime illumination of the display and, unfortunately, reduces the amount of light that is detectable by the human eye. Furthermore, the special night vision filter does not duplicate the visual colors normally specified for aviation displays, i.e., amber and red. As a result, during daytime operation of the aircraft, the daytime lighting level of the instrument display is reduced from its maximum brightness level and, thereby, increases the likelihood that the display will be washed out by direct sunlight. Also, during daytime operation the visual color appearance must be comprised to achieve nighttime compatibility with the goggles.

Other problems associated with this prior art approach include the size and inefficiency of the control circuits that apply the variable voltage to the lamps. For example, in one type of prior art control circuit, operational amplifiers are connected as buffers to control the voltage applied to the instrument lamps. Unfortunately, such a circuit is relatively inefficient because the voltage drop through an operational amplifier configured as a buffer is relatively high. Equally important, the voltage drop through the buffer reduces the magnitude of the voltage available to the instrument lamps and, thus, reduces the brightness of the lamps during daytime operation. In addition, because prior art control circuits typically use discrete electrical components, they hinder efforts to reduce the size and weight of the parts used in aircraft.

Another prior art approach to providing dual illumination levels uses two sets of instrument displays. One set of instrument displays is used during the nighttime operation of the aircraft and one set of instrument displays is used during the daytime operation. Each of the nighttime instrument displays is used during the daytime operation. Each of the nighttime instrument displays has a night vision goggle compatible filter so as to make it readable by crew members wearing the goggles. While not necessary in all cases, each of the daytime instrument displays may have a filter designed to improve the readability of the instruments during the daytime operation of the aircraft. While this approach overcomes the common filter problem discussed above, a significant problem arises with this approach, namely, the additional weight and space requirements of the second set of instrument displays.

As can be appreciated from the foregoing discussion, there is a need for an aircraft instrument display that can be lighted to satisfactory nighttime and daytime illumination levels. The instrument display should have a night vision compatible filter that is used for nighttime illumination of the display but not for daytime illumination. The control circuit used to control the instrument lamps should be efficient and compact. The present invention is directed to a novel dimming circuit and a dual display instrument designed to achieve these results.

SUMMARY OF THE INVENTION

In accordance with the present invention, a dimming circuit for controlling first and second lamps in a dual display is provided. The dimming circuit includes: a first voltage divider; a threshold voltage circuit; and a switch. The dimming circuit is controlled by controlling the magnitude of a variable supply voltage. The supply voltage is divided by the first voltage divider to produce an input voltage, which is applied to a first input of the switch. The threshold voltage circuit receives the supply voltage and produces a threshold voltage whose value is high when the magnitude of the supply voltage is high and whose value is low when the magnitude of the supply voltage is low. The high value of the threshold voltage is substantially greater than the magnitude of the input voltage and the low value of the threshold voltage is substantially less than the magnitude of the input voltage. The threshold voltage is applied to a second input of the switch. When the magnitude of the threshold voltage exceeds the magnitude of the input voltage, the switch is in a first state. In the first state, the value of the voltage at a first output of the switch causes a first or bright lamp of the dual display to be lit, and the value of the voltage at a second output of the switch causes a second or dim lamp of the dual display to be turned off. When the magnitude of the threshold voltage is less than the magnitude of the input voltage, the switch is in a second state. In the second state, the value of the voltage at the first output of the switch causes the bright lamp to be turned off, and the value of the voltage at the second output of the switch causes the dim lamp to be lit.

In accordance with further aspects of the present invention, the threshold voltage circuit includes: a reference voltage supply; a second voltage divider; and, a reference comparator. The reference voltage supply receives the supply voltage and produces a reference voltage. The second voltage divider produces a lower magnitude supply voltage whose value tracks the supply voltage. The reference comparator compares the reference voltage and the lower magnitude supply voltage and produces the threshold voltage. The threshold voltage value is high when the lower magnitude supply voltage exceeds the reference voltage and low when the lower magnitude supply voltage is less than the reference voltage. Thus, the magnitude of the variable supply voltage controls the value of the threshold voltage, which determines whether the bright lamp is lit or the dim lamp is lit.

In accordance with further aspects of the present invention, the switch includes first and second comparators. The first comparator compares the input and threshold voltages and produces the first output, i.e., the output that controls the bright lamp of the dual display. The second comparator compares the input and threshold voltages and produces the second output, i.e., the output that controls the dim lamp of the dual display.

In accordance with further aspects of the present invention, an aircraft instrument dual display assembly is provided. The assembly includes a dual display and a dimming circuit. The dual display is mounted in a housing and has first (bright) and second (dim) lamps, first and second indicia and at least a night vision goggle compatible filter. When the switch in the dimming circuit is in the first state, the value of the first output of the switch causes the first lamp to light the first indicia to a daytime illumination level. When the switch is in the second state, the value of the second output of the switch causes the second lamp to light the second indicia to a nighttime illumination level. The light produced by the second lamp is filtered by the night vision goggle compatible filter, such that the second display is readable by crew members wearing night vision goggles.

In accordance with still further aspects of the present invention, a switching network responsive to the magnitude of a supply voltage produced by a variable voltage source is provided. The switching network includes the first voltage divider, the threshold voltage circuit and the switch. The switch has first and second outputs and is responsive to the input and threshold voltages. When the threshold voltage exceeds the input voltage, the switch produces a low voltage at the first output and a high voltage at the second output. When the threshold voltage is less than the input voltage, the switch produces a high voltage at the first output and a low voltage at the second output.

As will be appreciated from the foregoing summary, the invention provides a novel dimming circuit for use with a dual display aircraft instrument having two lamps, wherein one lamp is used to light a daytime indicia and the other lamp is used to light a nighttime indicia.

BRIEF DESCRIPTION OF THE DRAWING

The foregoing and other features of the present invention will be better understood from the following description of the preferred embodiment of the invention when taken in conjunction with the accompanying drawing, which is a schematic diagram of a preferred embodiment of a dimming circuit and illuminated instrument assembly formed in accordance with the present invention.

DESCRIPTION OF THE PREFERRED EMBODIMENT

There has developed a need for an aircraft instrument that provides a display that is suitable for both daytime and nighttime operation of the aircraft. The present invention is a dual display that includes a novel dimming circuit designed to accomplish this result.

As will become better understood from the following discussion, the dimming circuit of the present invention is basically a switching network with one input and two outputs. A variable supply voltage is applied to the input. The two outputs are connected to two lamps (or sets of lamps) of an illuminated display. The dimming circuit is responsive to the variable supply voltage, such that when the supply voltage has a high value, the dimming circuit is in a first (i.e., daytime) state and causes a first lamp in the instrument to be turned on, i.e., lighted, and a second lamp to be turned off, i.e., not lighted. Substantially the entire high value of the supply voltage is applied to the first lamp, causing the first lamp to be brightly lit. When the supply voltage changes to a low value, the dimming circuit switches to a second (i.e., nighttime) state and causes the first lamp to be turned off and the second lamp to be turned on. The second lamp is dimly lit because the value of the supply voltage applied to the second lamp is low. As a result, when the supply voltage changes from a high value to a low value the dimming circuit creates a dim display. On the other hand, when the supply voltage changes from a low value to a high value, the dimming circuit causes the display to be brightly illuminated. As will be discussed below, the magnitude of the variable supply voltage may be changed by any suitable switching means well known in the art.

The accompanying figure, which illustrates a preferred embodiment of an assembly, comprises a dimming circuit 10 and an illuminated instrument display 12 both formed in accordance with the present invention. The dimming circuit 10 comprises: a voltage divider 14; a threshold voltage circuit 15; and, a switch 16. The voltage divider 14 comprises two resistors, designated R1 and R2. The threshold voltage circuit 15 comprises: an operational amplifier configured as a comparator, hereinafter referred to as the reference comparator, designated OA3; a zener diode, designated D1; and, five resistors, designated R3, R4, R5, R6, and R7. The switch 16 further comprises two operational amplifiers configured as comparators, designated OA1 and OA2. The illuminated instrument display 12, is preferably a dual display having two lamps, or sets of lamps, designated L1 and L2, two filters 20 and 22, and two identical displays, or indicia, 24 and 26.

A variable supply voltage, designated $V_S$, produced by a $V_S$ source 18 is applied to one end of R1, R3, and R5, and to one side of L1 and L2. The other end of R1 is connected to ground through R2, to the noninverting input of OA1 and to the inverting input of OA2. The other side of R3 is connected to the cathode of D1 and to one end of R4. The anode of D1 is connected to ground. The other end of R4 is connected to the inverting input of OA3. The other end of R5 is connected to one end of R6 and to the noninverting input of OA3. The other end of R6 is connected to ground. The output of OA3 is connected to one end of R7. The other end of R7 is connected to the inverting input of OA1 and the noninverting input of OA2. The output of OA1 is connected to the other side of L1 and the output of OA2 is connected to the other side of L2. The $V_S$ voltage is applied to the positive power supply inputs of OA1, OA2, and OA3. The negative power supply inputs of OA1, OA2, and OA3 are connected to ground. In accordance with the preferred embodiment of the invention, OA1, OA2, and OA3 have a common power supply input, which is illustrated in the figure by the dotted connections to OA2 and OA3. To reduce the size and weight of the dimming circuit 10, it is preferably formed as an integrated circuit. To further reduce space requirements, the dimming circuit is preferably mounted in the same housing as the instrument display 12.

Unlike prior art night vision goggle compatible instrument displays, which use one set of lamps, one filter and one indicia for both daytime and nighttime illumination, the display 12 depicted in the figure uses one lamp, L1, one filter 20, and one indicia 24 for daytime illumination and another lamp, L2, the other filter 22, and the other indicia 26 for nighttime illumination. The daytime filter 20 may be a different color than the nighttime filter 22.

The nighttime filter 22, on the other hand, is required in aircraft applications in which crew members wear night vision goggles. Accordingly, the nighttime filter 22 is a night vision goggle compatible filter that allows the second indicia 26 to be readable by goggle-wearing crew members and will not cause interference with the use of goggles by crew members. Basically, as is well known in the art, night vision goggle compatible filters attenuate light wavelengths that are detectable by night vision goggles. Since contemporary night vision goggles are sensitive to light energy in the 600-900 nm range, filter 22 substantially reduces light energy in the 600-900 nm range. Since night vision goggle compatible filters are well known in the art, they are not discussed in detail herein.

An example of a dual display suitable for use as the instrument display 12 depicted in the figure and discussed above is the Model 427 line of illuminated displays manufactured by Korry Electronics Co., Seattle, Wash.

The operation of the dimming circuit 10 depicted in the figure and described above is presented below by way of two examples. In the first example, the operation of the dimming circuit 10 during daytime illumination of the instrument display 12 is described. In the second example, the operation of the dimming circuit 10 during nighttime illumination of the instrument display 12 is described. Which mode of operation is in effect is determined by the magnitude of the supply voltage, $V_S$. That is, the supply voltage, $V_S$, is provided by the variable voltage source whose magnitude may be changed by any suitable means, such as a switch or rheostat. Further, the switching may be done manually by a crew member or automatically by an onboard computer. While the specific $V_S$ switching means does not, per se, form a part of the present invention, the effect created by the $V_S$ switching means does form part of the invention.

In a typical aircraft electrical system, for example, the magnitude of the $V_S$ voltage may have a range of 0-28 VDC. Accordingly, in the examples which follow, the high value of $V_S$ is chosen to be 28 VDC and the low value of $V_S$ is chosen to be 14 VDC. The voltages noted above are intended to be illustrative only and it is to be understood that the operation of the dimming circuit 10 is not limited to these particular values.

As will become further evident from the following examples, the voltage divider 14 and the threshold voltage circuit 15 provide precise switching of OA1 and OA2 by maintaining a substantial difference between the magnitudes of the voltages applied to the inputs of OA1 and OA2. Hence, in applications in which precise switching is not required, the dimming circuit 10 can be operated without the voltage divider 14 or OA3 and R7 of the threshold voltage circuit 15.

Proceeding with the first example (i.e., the daytime illumination of the display 12), the $V_S$ voltage is switched to a high value (e.g., 28 VDC). The voltage divider 14 formed by R1 and R2 divides the $V_S$ voltage and produces an input voltage, designated $V_{IN}$. In the presently preferred embodiment, the magnitude of $V_{IN}$ is equal to one-half the magnitude of $V_S$ (i.e., $V_{IN}=14$ VDC). The $V_{IN}$ voltage is applied to the noninverting input of OA1 and to the inverting input of OA2.

The threshold voltage circuit includes a reference voltage supply, formed by D1, R3 and R4, which produces a reference voltage, designated $V_{REF}$. The zener diode, D1, operates in a conventional manner and is selected so that the magnitude of the zener voltage (i.e., the avalanche breakdown voltage), designated $V_{D1}$, is between the high and low values of $V_S$ (i.e., 28 and 14 VDC, respectively). In keeping with the present example, a 18 VDC zener diode is selected (i.e., $V_{D1}=18$ VDC). Due to the operation of D1, when $V_S$ has a high value, the magnitude of the $V_{REF}$ voltage is equal to the $V_{D1}$ voltage (i.e., $V_{REF}=V_{D1}=18$ VDC). R5 and R6 form a voltage divider that produces a lower magnitude supply voltage, designated $V'_S$, whose value tracks $V_S$. The $V'_S$ voltage is applied to the noninverting input of OA3. Preferably, the value of R5 is much less than the value of R6 so that the value of $V'_S$ is only slightly less than the value of $V_S$. In the present example, R5 and R6 are sized so that $V'_S=24$ VDC when $V_S=28$ VDC. The significance of this relationship between $V'_S$ and $V_S$ will become apparent in the discussion of the second example, below.

When $V_S$ is high, the $V'_S$ voltage is greater than the $V_{REF}$ voltage (i.e., $V'_S > V_{REF}$). As a result, OA3 is in a high state, and produces a high output. The OA3 output is a threshold voltage, designated $V_T$. Since the positive power supply input of OA3 is connected to $V_S$, the value of a high $V_T$ voltage is equal to the magnitude of $V_S$. Accordingly, the value of $V_T$ is greater than the value of $V_{IN}$ and, more particularly, $V_T$ is substantially greater than $V_{IN}$. As a result, the switch 16 is in a first state. In the first state, OA1 is in a low state and OA2 is in a high state. More specifically, because the negative power supply input of OA1 is connected to ground, the output of OA1 is grounded and the voltage at the output of OA1 is substantially zero. The voltage at the output of OA2, on the other hand, is substantially equal to the value of $V_S$, because the positive power supply input of OA2 is connected to $V_S$. Since the voltage at the output of OA1 is substantially zero, practically the entire $V_S$ voltage is dropped across L1, thereby causing L1 to be brightly lit. Contrariwise, since the voltage at the output of OA2 is substantially equal to $V_S$, the voltage dropped across L2 is practically zero and L2 is not lit. Thus, as illustrated in the above example, when $V_S$ is switched high, L1 provides daytime illumination of the instrument display 12, via the indicia 24.

As noted above, both OA1 and OA2 are configured as comparators, whereas prior art dimmers typically use operational amplifiers configured as buffers. The significance of this distinction is that the voltage drop through an operational amplifier is substantially less when configured as a comparator than when configured as a buffer. For example, in one physical embodiment of the dimming circuit 10, the voltage drop through the operational amplifiers, OA1 and OA2 is approximately 0.2 VDC. The voltage drop in comparable operational amplifiers configured as buffers is approximately 0.7 VDC. The low voltage drop through OA1 permits the low output of OA1 to be substantially grounded so that the voltage across L1 is substantially equal to $V_S$ (i.e., $V_S$-0.2 VDC). If, however, OA1 were configured as a buffer, as in the prior art, the voltage drop through OA1 would be higher and the corresponding voltage across L1 would be substantially less (i.e., $V_S$-0.7 VDC), thereby reducing the brightness of L1. Thus, by configuring OA1 as a comparator, practically the entire $V_S$ voltage is dropped across L1, causing L1 to be illuminated to a maximum brightness, which, as noted above, is desirable for daytime illumination of the instrument display 12.

Similarly, the voltage drop through OA2, when OA2 is configured as a comparator, is also substantially less than when OA2 is configured a a buffer. Accordingly, the high output of OA2 is substantially equal to $V_S$ (i.e., $V_S$-0.2 VDC) and the corresponding voltage across L2 is very low. As a result, L2 is not lit. If, on the other hand, OA2 was configured as a buffer, the voltage drop through OA2 would be significantly higher and the corresponding voltage across L2 would be higher, which may cause L2 to be lit. Since, as noted above, L2 is not to be lit during daytime illumination of the instrument display 12, the lighting of L2, even if only slightly, is undesirable.

Turning to the second example (i.e., the nighttime illumination of the instrument display 12), $V_S$ is switched to a low value (i.e., 14 VCD). In keeping with the relationships set forth in the first example, above, the $V_{IN}$ and $V'_S$ voltages also have lower values (i.e., $V_{IN}$=7 VCD and $V'_S$=12 VDC). In this example, the value of $V_S$ is now less than the value of $V_{D1}$ (where $V_{D1}$ is the zener voltage of D1 and, as noted in the above example, equals 18 VDC). As a result, the reference voltage supply formed by D1, R3, and R4, produce a $V_{REF}$ voltage whose value is less than the magnitude of $V_{D1}$. More particularly, the value of $V_{REF}$ is equa the magnitude of $V_S$ (i.e., $V_{REF}$=14 VDC). As noted in the above example, the $V'_S$ voltage is determined by R5 and R6 and is always slightly less than the value of $V_S$ and, in this example, is equal to 12 VDC. As illustrated in this example, during nighttime illumination of the instrument display 12, the value of $V'_S$ is less than the value of $V_{REF}$ and OA3 switches to a low state. Hence, the output of OA3 (i.e., $V_T$) goes low. Because the negative power supply terminal of OA3 is connected to ground, the low output ($V_T$) is zero volts.

Because $V_T$ is equal to zero volts, $V_T$ is substantially less than $V_{IN}$. As a result, the switch 16 switches to a second state. In the second state, OA1 switches high and OA2 switches low. Because of the way the positive and negative power supply terminals of OA1 and OA2 are connected, the high voltage at the OA1 output is substantially equal to $V_S$, and the low voltage at the OA2 output is substantially equal to zero. As a result, the voltage dropped across L1 is very low and L1 is turned off. Contrariwise, the voltage dropped across L2 is substantially equal to the low value of $V_S$ and L2 is lit. The low $V_S$ voltage causes the L2 lamp to be dimly lit such that the nighttime illumination of the instrument display 12 provided by L2 and the indicia 26 is lower than the daytime illumination provided by L1 and the indicia 24.

The dimming circuit 10 of the invention described above is well suited for controlling the lighting level of a dual display instrument, such as the instrument display 12 depicted in the figure. While this is the principle use for which the dimming circuit 10 was developed, it is to be understood that the present invention is also suitable for use with loads other than an illuminated display. For example, the dimming circuit 10 could also be used as a switch to supply different voltages to a low voltage control circuit in applications where high efficiency and precise switching between different voltage levels are required.

As discussed above, the voltage divider 14 and the threshold voltage circuit 15 operate to maintain a substantial difference between values of $V_{IN}$ and $V_T$, which allows for precise switching of OA1 and OA2. If, however, such precision is not required, the dimming circuit 10 of the present invention may also be operated without the voltage divider 14 or OA3 and R7 of the threshold voltage circuit 15. In such a situation, the $V'_S$ and $V_{REF}$ voltages may be applied directly to the inputs of OA1 and OA2. However, the switching of OA1 and OA2 may become erratic for very close values of $V'_S$ and $V_{REF}$. For example, if the values of $V'_S$ and $V_{REF}$ are very close, the manufacturing tolerances of OA1 and OA2 may cause both OA1 and OA2 to incorrectly switch high or low at the same time. As a result, both L1 and L2 may be lit or not lit at the same time. As can well be appreciated, the later situation is highly undesirable for an illuminated aircraft instrument display application, where even a temporarily unlighted display may place the aircraft and crew in immediate peril.

As can be readily appreciated from the foregoing description, the invention provides a dimming circuit for use with a dual display instrument and provides both daytime and nighttime illumination of the instrument display. Further, the nighttime illumination of the display is compatible with night vision goggles. In addition, the dimming circuit is preferably formed as an integrated circuit such that it can be mounted in, and made a part of, the instrument display.

While a preferred embodiment of the invention has been illustrated and described herein, it is to be understood that, within the scope of the appended claims, various changes can be made. The particular voltage values used in the examples to describe the preferred embodiment are merely illustrative and it is to be understood that the present invention will function equally well with other voltages. As noted above, the dimming circuit may be operated without the voltage divider and part of the threshold voltage circuit if precise switching between daytime and nighttime illumination is not required. The display may be used without the daytime filter. Further, both the daytime filter (if used) and the night vision goggle compatible filter may be incorporated into, and form part of the respective indicia. Hence, the invention can be practiced otherwise than as specifically described herein.

The embodiments of the invention in which an exclusive property or privilege is claimed are defined as follows:

1. A dimming circuit responsive to the magnitude of a supply voltage produced by a variable voltage source for controlling first and second lamps in a dual display, said dimming circuit comprising:
    (a) input means for receiving the supply voltage produced by the variable voltage source and producing an input voltage whose magnitude tracks the supply voltage produced by the variable voltage source;
    (b) threshold voltage means for receiving the supply voltage produced by the variable voltage source and producing a threshold voltage having a high value when the supply voltage produced by the variable voltage source has a high value and a low value when the supply voltage produced by the variable voltage source has a low value, such that said high value of said threshold voltage is substantially greater than the magnitude of said input voltage and said low value of said threshold voltage is substantially less than the magnitude of said input voltage; and,
    (c) a switch having a first input coupled to receive said input voltage, a second input coupled to receive said threshold voltage, a first output coupled to the first lamp of the dual display, and a second output coupled to the second lamp of the dual display, said switch being responsive to said input voltage and said threshold voltage, such that when said threshold voltage exceeds said input voltage said switch produces a low voltage at said first output of said switch that causes the first lamp to be brightly lit and a high voltage at said second output of said switch that causes the second lamp to be off and, such that when said threshold voltage is less than said input voltage said switch produces a high voltage at said first output of said switch that causes the first lamp to be off and a low voltage at said second output of said switch that causes the second lamp to be dimly lit.

2. The dimming circuit claimed in claim 1, wherein said threshold voltage means comprises:
    (a) a reference voltage supply coupled to the variable voltage source for producing a reference voltage;
    (b) a second voltage divider coupled to the variable voltage source for dividing the supply voltage produced by the variable voltage source and producing a lower magnitude supply voltage whose magnitude tracks the supply voltage produced by the variable voltage source; and,
    (c) a reference comparator for comparing said reference voltage and said lower magnitude supply voltage and producing said threshold voltage, such that said threshold voltage has said high value when the magnitude of said lower magnitude supply voltage exceeds the magnitude of said reference voltage and said threshold voltage has said low value when the magnitude of said lower magnitude supply voltage is less than the magnitude of said reference voltage.

3. The dimming circuit claimed in claim 2, wherein said input means is a first voltage divider.

4. The dimming circuit claimed in claim 1, wherein said switch comprises:
    (a) a first comparator coupled to receive said input voltage and said threshold voltage, such that the output of said first comparator forms said first output of said switch; and,
    (b) a second comparator coupled to receive said input voltage and said threshold voltage, such that the output of said second comparator forms said second output of said switch.

5. The dimming circuit claimed in claim 4, wherein said threshold voltage means comprises:
    (a) a reference voltage supply coupled to the variable voltage source for producing a reference voltage;
    (b) a second voltage divider coupled to the variable voltage source for dividing the supply voltage produced by the variable voltage source and producing a lower magnitude supply voltage whose magnitude tracks the supply voltage produced by the variable voltage source; and,
    (c) a reference comparator for comparing said reference voltage and said lower magnitude supply voltage and producing said threshold voltage, such that said threshold voltage has said high value when the magnitude of said lower magnitude supply voltage exceeds the magnitude of said reference voltage and said threshold voltage has said low value when the magnitude of said lower magnitude supply voltage is less than said threshold voltage.

6. The dimming circuit claimed in claim 5, wherein said input means is a first voltage divider.

7. The dimming circuit claimed in claim 6, wherein the magnitude of said input voltage is substantially equal to one-half the magnitude of the supply voltage produced by the variable voltage source.

8. The dimming circuit claimed in claim 6, wherein said dimming circuit is formed as an integrated circuit.

9. The dimming circuit claimed in claim 1, wherein said dimming circuit is formed as an integrated circuit.

10. An aircraft instrument dual display assembly coupled to a variable voltage source, said assembly comprising:
    (a) a dual display mounted in a housing and having a first indicia, a second indicia, a first lamp capable of illuminating said first indicia, and a second lamp capable of illuminating said second indicia; and,
    (b) dimming means responsive to a supply voltage produced by the variable voltage source for controlling the illumination of said first and second indicia by said first and second lamps, such that when the magnitude of the supply voltage is high said dimming means causes said first lamp to be brightly lit and said second lamp to be off, and when the magnitude of the supply voltage is low said dimming means causes said first lamp to be off and said second lamp to be dimly lit, said dimming means comprising:
        (1) input means for receiving the supply voltage produced by the variable voltage source and producing an input voltage whose magnitude tracks the supply voltage produced by the variable voltage source;

(2) threshold voltage means for receiving the supply voltage produced by the variable voltage source and producing a threshold voltage having a high value when the supply voltage produced by the variable voltage source has a high value and a low value when the supply voltage produced by the variable voltage source has a low value, such that said high value of said threshold voltage is substantially greater than the magnitude of said input voltage and said low value of said threshold voltage is substantially less than the magnitude of said input voltage; and, (3) a switch having a first input coupled to receive said input voltage, a second input coupled to receive said threshold voltage, a first output coupled to said first lamp of said dual display, and a second output coupled to said second lamp of said dual display, said switch being responsive to said input voltage and said threshold voltage, such that when said threshold voltage exceeds said input voltage said switch produces a low voltage at said first output of said switch that causes said first lamp to be brightly lit and a high voltage at said second output of said switch that causes said second lamp to be off, and such that when said threshold voltage is less than said input voltage said switch produces a high voltage at said first output of said switch that causes said first lamp to be off and a low voltage at said second output of said switch that causes said second lamp to be dimly lit.

11. The assembly claimed in claim 10, wherein said dual display further comprises an optical filter for filtering the light energy produced by said second lamp.

12. The assembly claimed in claim 11, wherein said optical filter is a night vision goggle compatible filter.

13. The assembly claimed in claim 12, wherein said night vision goggle compatible filter filters light energy in the 600-900 nm range.

14. The assembly claimed in claim 12, wherein said dimming means is an integrated circuit mounted in said housing of said dual display.

15. The assembly claimed in claim 10, wherein said switch comprises:

(a) a first comparator coupled to receive said input voltage and said threshold voltage, such that the output of said first comparator forms said first output of said switch; and, (b) a second comparator coupled to receive said input voltage and said threshold voltage, such that the output of said second comparator forms said second output of said switch.

16. The assembly claimed in claim 15, wherein said threshold voltage means comprises:

(a) a reference voltage supply coupled to the variable voltage source for producing a reference voltage;

(b) a second voltage divider coupled to the variable voltage source for dividing the supply voltage produced by the variable voltage source and producing a lower magnitude supply voltage whose magnitude tracks the supply voltage produced by the variable voltage source; and, (c) a reference comparator for comparing said reference voltage and said lower magnitude supply voltage and producing said threshold voltage, such that said threshold voltage has said high value when the magnitude of said lower magnitude supply voltage exceeds the magnitude of said reference voltage and said threshold voltage has said low value when the magnitude of said lower magnitude supply voltage is less than the magnitude of said reference voltage.

17. The assembly claimed in claim 16, wherein said input means is a first voltage divider.

18. The assembly claimed in claim 17, wherein said dimming means is a dimming circuit formed as an integrated circuit.

19. The assembly claimed in claim 18, wherein said dimming circuit is mounted in said housing of said dual display.

20. A switching network responsive to the magnitude of a supply voltage produced by a variable voltage source, said switching network comprising:

(a) input means for receiving the supply voltage produced by the variable voltage source and producing an input voltage whose magnitude tracks the supply voltage produced by the variable voltage source over its range;

(b) threshold voltage means for receiving the supply voltage produced by the variable voltage source and producing a threshold voltage having a high value when the supply voltage produced by the variable voltage source has a high value and a low value when the supply voltage produced by the variable voltage source has a low value, such that said high value of said threshold voltage is substantially greater than the magnitude of said input voltage and said low value of said threshold voltage is substantially less than the magnitude of said input voltage; and, (c) a switch having a first input coupled to receive said input voltage, a second input coupled to receive said threshold voltage, and first and second outputs, said switch being responsive to said input voltage and said threshold voltage, such that when said threshold voltage exceeds said input voltage said switch produces a low voltage at said first output of said switch and a high voltage at said second output of said switch and, such that when said threshold voltage is less than said input voltage said switch produces a high voltage at said first output of said switch and a low voltage at said second output of said switch.

21. The switching network claimed in claim 20, wherein said switch comprises:

(a) a first comparator coupled to receive said input voltage and said threshold voltage, such that the output of said first comparator forms said first output of said switch; and, (b) a second comparator coupled to receive said input voltage and said threshold voltage, such that the output of said second comparator forms said second output of said switch.

22. The switching network claimed in claim 21, wherein said threshold voltage means comprises:

(a) a reference voltage supply coupled to the variable voltage source for producing a reference voltage;

(b) a second voltage divider coupled to the variable voltage source for dividing the supply voltage produced by the variable voltage source and producing a lower magnitude supply voltage whose magnitude tracks the supply voltage produced by the variable voltage source; and, (c) a reference comparator for comparing said reference voltage and said lower magnitude supply voltage and producing said threshold voltage, such that said threshold voltage has said high value when the magnitude of said lower magnitude supply voltage exceeds the magnitude of said reference voltage and said threshold voltage has said low value when the magnitude of said lower magnitude supply voltage is less than the magnitude of said reference voltage.

23. The switching network claimed in claim 22, wherein said input means is a first voltage divider.

24. The switching network claimed in claim 23, wherein said switching network is formed as an integrated circuit.

25. The switching network claimed in claim 20, wherein said switching network is formed as an integrated circuit.

* * * * *

UNITED STATES PATENT AND TRADEMARK OFFICE
CERTIFICATE OF CORRECTION

PATENT NO. : 5,049,869
DATED : September 17, 1991
INVENTOR(S) : G. W. Harris

It is certified that error appears in the above-identified patent and that said Letters Patent is hereby corrected as shown below:

| COLUMN | LINE | ERROR |
|--------|------|-------|
| 2 | 2 | "comprised" should read --compromised-- |
| 7 | 53 | "VCD" should read --VDC-- |
| 7 | 56 | "VCD" should read --VDC-- |
| 7 | 63 | "equa" should read --equal-- |
| 8 | 49 | "later" should read --latter-- |

Signed and Sealed this

Ninth Day of March, 1993

Attest:

STEPHEN G. KUNIN

Attesting Officer

Acting Commissioner of Patents and Trademarks